United States Patent [19]

Young

[11] 4,270,807
[45] Jun. 2, 1981

[54] VEHICLE FLUID PRESSURE BRAKING SYSTEMS AND LEVER MECHANISMS FOR USE THEREIN

[75] Inventor: Alastair J. Young, Kenilworth, England

[73] Assignee: Automotive Products Limited, Leamington Spa, England

[21] Appl. No.: 16,380

[22] Filed: Mar. 1, 1979

[30] Foreign Application Priority Data

Mar. 2, 1978 [GB] United Kingdom ............... 08250/78

[51] Int. Cl.³ ............................................. B60T 8/18
[52] U.S. Cl. .................................. 303/22 R; 188/195
[58] Field of Search .................. 303/22 R, 22 A, 6 A, 303/6 R, 6 C; 188/195, 349; 180/271, 104; 280/88; 74/469, 471, 479

[56] References Cited

U.S. PATENT DOCUMENTS

| | | | |
|---|---|---|---|
| 3,848,932 | 11/1974 | Lewis | 303/22 R X |
| 4,039,041 | 8/1977 | Farrow | 280/88 |

FOREIGN PATENT DOCUMENTS

1268491 3/1972 United Kingdom .

Primary Examiner—Douglas C. Butler
Attorney, Agent, or Firm—Kemon & Estabrook

[57] ABSTRACT

The invention relates principally to vehicle fluid pressure braking systems in which valve devices controlled by the vehicle suspension system operate only during vehicle cornering to reduce pressure to the brake which is on a wheel which is on the inside of the corner.

The braking system uses a variable ratio lever mechanism to balance the loadings due to pressure in two valve devices. The lever mechanism includes levers, control links, balance beam and a reaction link. A control mechanism, which can be of a known kind, moves the reaction link during vehicle cornering and thus alters the angle which each control link makes with a line joining the axes of the lever pivots and the link pivots.

10 Claims, 10 Drawing Figures

VEHICLE FLUID PRESSURE BRAKING SYSTEMS AND LEVER MECHANISMS FOR USE THEREIN

The invention relates to vehicle fluid pressure braking systems of the kind in which valve devices controlled by the vehicle suspension system operate only during vehicle cornering to reduce the pressure supplied to the brake of a road wheel which is on the inside of the corner. It also relates to lever mechanisms which are particularly, but not exclusively, for use in such braking systems.

Braking systems of the kind referred to above have been described in U.S. Pat. Nos. 4,030,771 and 4,140,201 and in 4,111,494. With a particular level of friction between wheel and road these systems provide braking characteristics for the inboard wheel which approach the ideal over some ranges of master cylinder pressure and cornering acceleration but it has not been possible to match the ideal for all conditions of braking and cornering.

According to one aspect, the present invention provides a fluid pressure braking system for a vehicle having a resilient suspension system, the braking system comprising a driver-controlled source of fluid pressure, a first valve device interposed between said source and a brake for a road wheel which is on one side of the vehicle, a second valve device interposed between said source and a brake for a road wheel which is on the other side of the vehicle, each valve device including a plunger which is subject to a fluid pressure loading from the pressure supplied to the respective brake and which, when moved in one direction, co-operates with valve means in the valve device to prevent flow from the source to the respective brake and reduce the pressure supplied to the brake relative to the source pressure, the braking system further comprising a lever mechanism linking the plungers such that during normal braking the effort applied to the plunger of one valve device by the fluid pressure loading within said one valve device is balanced by the effort applied to the plunger of the other valve device by the fluid pressure loading within said other valve device, and a control mechanism responsive to vehicle suspension loads to exert an influence on the lever mechanism only during cornering of the vehicle so that the valve device associated with the inboard wheel is operative to reduce the pressure supplied to the brake of that wheel, wherein the lever mechanism has a variable ratio which is changed by the control mechanism during cornering by an amount which is dependent on the differences in the vertical loads borne by each of said road wheels.

The lever mechanism may comprise simply a beam operatively connected adjacent one end thereof to the plunger of one of the valve devices and adjacent the other end thereof to the plunger of the other of the valve devices, the beam being pivotally mounted about an axis which is normally equidistant from the axes of the plunger but which during cornering of the vehicle is moved by the control mechanism towards the axis of one plunger and away from the axis of the other plunger to vary the lever ratio of the beam.

However, according to another aspect of the invention, a preferred variable ratio lever mechanism which is particularly, but not exclusively, for a braking system according to said one aspect of the invention includes a lever having means for transmitting one input or output load such as that applied to and from the plunger of one of the valve devices, a first pivotal connection for transmitting another input or output load such as that applied to and from the plunger of the other of the valve devices and a second pivotal connection for reacting the loads applied to the lever onto a frame so that the loads may be reacted onto the body of the vehicle, there being provided a control link through which is transmitted the load of one of the pivotal connections and a reaction link of substantially the same effective length as the control link for reacting a load in the control link onto the frame, the arrangment being such that the control link has a longitudinal axis which normally intersects a perpendicular line joining the axes of the pivotal connections at an angle which is substantially less than 90°, which angle is variable by pivotal movement of the control link to vary the effective moment arm which said other input or output load makes with the axis of the second pivotal connection, and such that the reaction link has a longitudinal axis which lies substantially parallel to the longitudinal axis of the control link over the normal operating range of pivotal movement of the control link. The lever may be a single beam having a pivotal connection adjacent one end thereof for transmitting one input or output load such as that applied to and from the plunger of one of the valve devices and a pivotal connection adjacent the other end thereof for transmitting another input or output load such as that applied to and from the plunger of the other of the valve devices so that each of said pivotal connections is a first pivotal connection, the beam having the axis of the second pivotal connection substantially equidistant from the axes of said first pivotal connections and offset from a perpendicular line passing through the axes of said first pivotal connections and the control link and the reaction link reacting the loads applied to the beam through the second pivotal connection onto the frame.

Alternatively two levers and two control links may be provided and are arranged so that each lever is directly pivoted on the frame by the respective second pivotal connection, there also being provided a beam which interconnects the levers and control links, the two control links being pivotally connected to the beam adjacent respective ends of the beam and the reaction link being pivotally connected to the beam substantially mid-way between the ends of the beam and being arranged to pivot on the frame to react the loads transmitted to the beam by the control links.

The invention will be described by way of example with reference to the accompanying drawings, of which:

Figure 1:
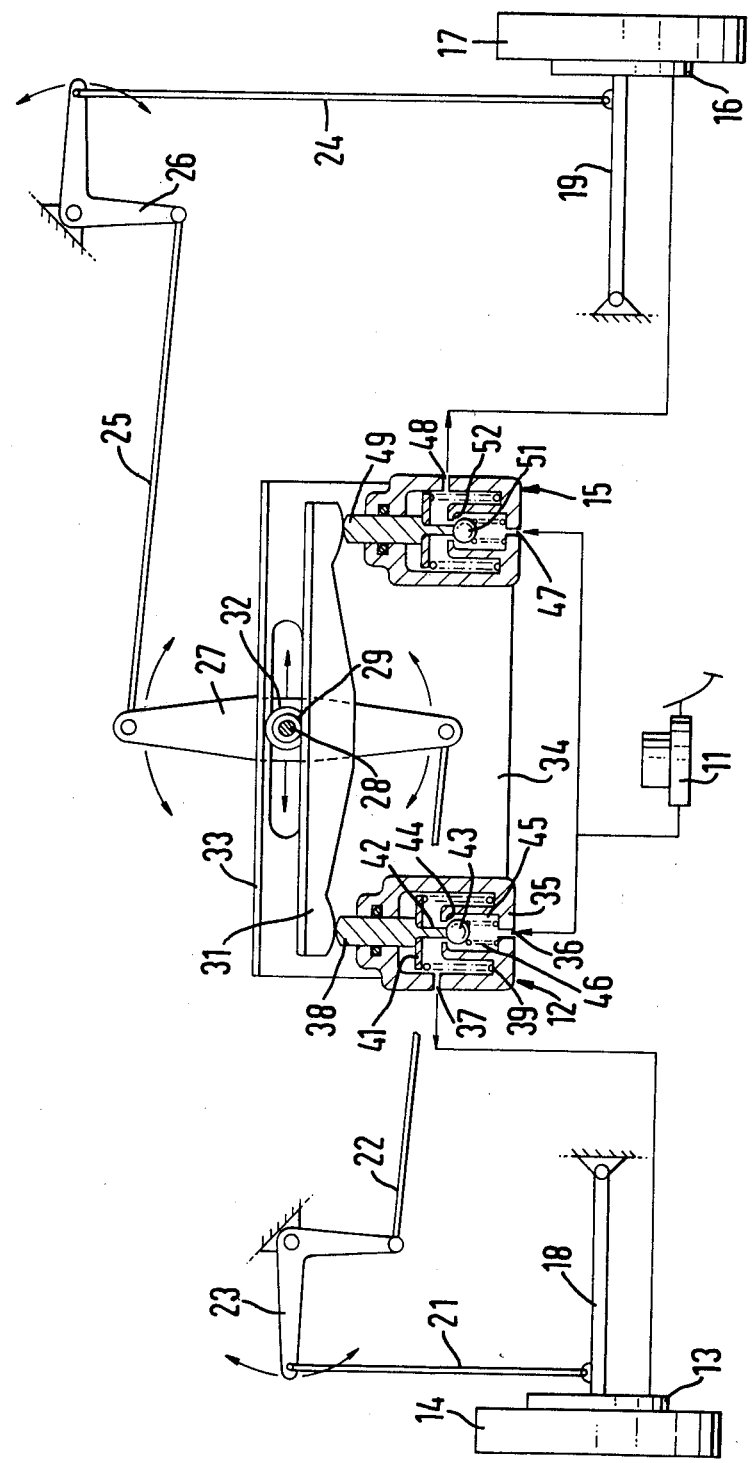
FIG. 1 is a view of one embodiment of a vehicle braking system according to the invention, including a part sectional view of a pair of valve devices and a lever mechanism and with other parts of the system shown diagrammatically.

In the braking system shown in FIG. 1 a driver controlled source of fluid pressure is in the form of a conventional hydraulic master cylinder 11. A first valve device 12 is interposed between the master cylinder 11 and a brake 13 acting on a front road wheel 14 which is on one side of the vehicle and a second, identical, valve device 15 is interposed between the master cylinder 11 and a brake 16 acting on a front road wheel 17 which is on the other side of the vehicle.

Each front wheel 14, 17 is resiliently suspended in a conventional manner which is not important to the present invention. For convenience, swing axles 18 and 19 are shown, wheel 14 being carried by swing axle 18 and wheel 17 being carried by swing axle 19. Hence an increase in the vertical load carried by wheel 14 causes swing axle 18 to pivot clockwise and an increase in the vertical load carried by wheel 17 causes swing axle 19 to pivot anticlockwise.

A vertical link 21, pivoted to swing axle 18, is connected to a horizontal like 22 through a bell-crank 23. Another vertical link 24, pivoted to swing axle 19, is connected to another horizontal link 25 through another bell-crank 26. The inner ends of the horizontal links 22 and 25 are connected to either end of a vertical beam 27 which carries a pivot pin 28 near its centre. The pivot pin 28 carries two rollers. One roller 29, of smaller diameter, acts as a fulcrum for a horizontal beam 31 and the other roller 32, of larger diameter, bears against a flange 33 on a plate 34 fixed to the body of the vehicle. The valve devices 12 and 15 are fastened to the plate 34.

The first valve device 12 includes a housing 35 having an inlet port 36 connected to the master cylinder 11 and an outlet port 37 connected to brake 13. A plunger 38 is biassed into abutment with the beam 31 by a light compression spring 39 which acts through a washer 41. The plunger 38 has a projection 42 which, as shown in FIG. 1, can hold a ball 43 off a valve seat 44 formed at one end of a passage 45 connected to the inlet port 36. A light compression spring 46 biasses the ball towards the valve seat 44.

The second valve device 15 is identical to the first valve device 12 so it will be necessary only to refer to the inlet port 47, outlet port 48, plunger 49, ball 51 and valve seat 52 corresponding to inlet port 36, outlet port 37, plunger 38, ball 43 and valve seat 44 respectively.

In FIG. 1 the parts are shown in a normal static condition. Pivot pin 28 is mid-way between the axes of the plungers 38 and 49 and both balls 43 and 51 are unseated. If the driver generates a pressure in the master cylinder the full pressure is transmitted to both brakes 13 and 16 since the force generated by fluid pressure acting on plunger 38 is the same as the force generated by fluid pressure acting on plunger 49 and since the beam 31 is in a 1:1 ratio position these forces balance out. This remains true for all normal straight ahead conditions of driving when the wheels 14 and 17 make equal deflections from their normal static positions. For example, if wheel 14 moves upwards relative to the vehicle body by a given amount, causing bell-crank 23 to pivot clockwise and wheel 17 moves upwards relative to the vehicle body by the same amount, causing bell-crank 26 to pivot anti-clockwise, the effect is to make the vertical beam 27 rotate freely in the clockwise direction without moving the axis of pivot pin 28.

If the vehicle corners such that, for example, wheel 14 is the wheel which is on the inside of the corner and thus supports less vertical load, then this wheel 14 moves downwards relative to the vehicle body whilst wheel 17 moves upwards relative to the body. Both bell-cranks 23 and 26 then move anti-clockwise so that, assuming that the magnitude of the wheel deflections are equal, the vertical beam 27 moves away from valve device 12 and towards the valve device 15 without rotation. Hence the pivot pin 28 is now further from the axis of plunger 38 than it is from plunger 49. The effect of this shift of the axis of pivot pin 28 is that when the driver creates a brake-applying pressure in the master cylinder 11 the force generated by brake pressure in valve devices 12 acting on plunger 38 creates a moment on the horizontal beam 31 which is greater than the opposing moment generated by the pressure in valve devices 15 acting on plunger 49 so that after only a small master cylinder pressure has been generated beam 31 rotates clockwise and allows plunger 38 to move away from inlet port 36 and causes ball 43 to seat and prevent flow from the master cylinder 11 to brake 13 whilst plunger 49 is moved towards inlet port 47 so that ball 51 remains unseated. However, a small further increase in master cylinder pressure causes brake pressure at outlet port 48 to rise whilst brake pressure at outlet port 37 remains at the previous value so that beam 31 is moved anticlockwise back towards its normal position, nudging ball 43 off its seat 44. This allows a small quantity of brake fluid past seat 44 and increases the brake pressure at outlet port 37, increasing the fluid pressure loading on plunger 38 once more and moving it away from inlet port 36 and allowing ball 43 to reseat. Ball 43 continues to be seated and unseated as master cylinder pressure is progressively increased so that the brake pressures at ports 37 and 48 are increased in the ratio of the distances between the axis of pivot pin 28 and the axes of the plungers 38 and 49. This relationship remains true when the pivot pin 28 assumes different positions for different cornering accelerations and directions and also if the brakes are already applied when the vehicle starts to corner, the reduction in brake pressure at the outlet port 37 or 48 being achieved by movement of the associated plunger 38 or 49 away from the inlet port 36 or 47 whilst the associated ball 43 or 51 remains seated.

Figure 2:
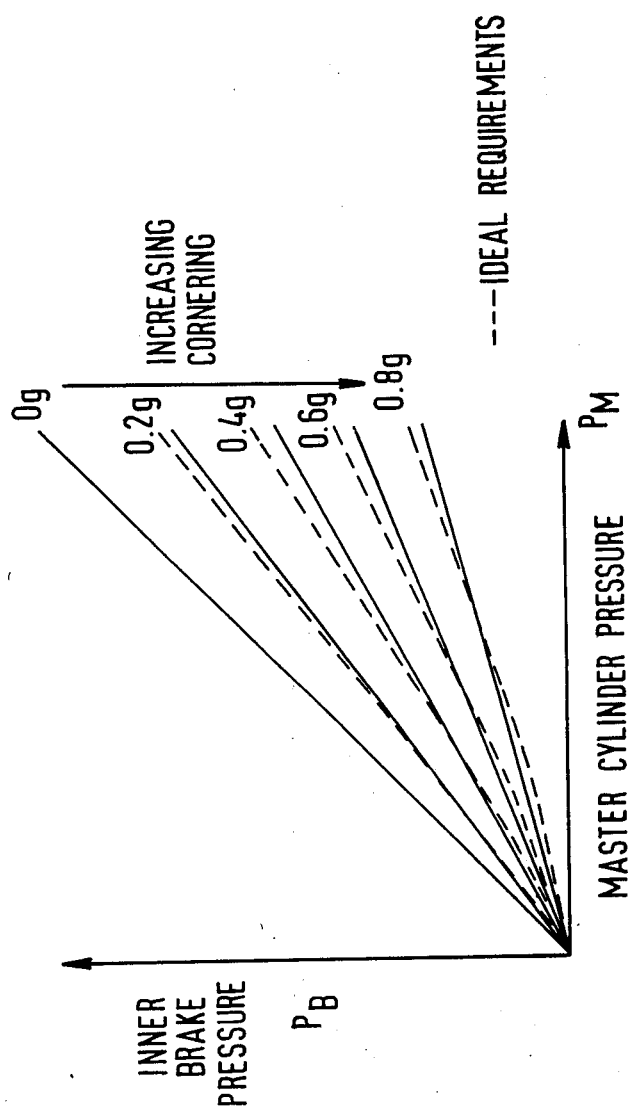
FIG. 2 is a graph of brake pressure plotted against master cylinder pressure for the braking system shown in FIG. 1.

The characteristics of the braking system described above with reference to FIG. 1 are shown in FIG. 2 as a graph of brake pressure at the road wheel which is on the inside of the corner ($P_B$) against master cylinder pressure ($P_M$) for various centripetal accelerations. The full lines show the computed values of brake pressure for the braking system on a typical vehicle. The chain-dotted lines show the ideal brake pressure for the same vehicle calculated on the basis of the maximum braking to be achieved with a limiting co-efficient of friction between the road wheel and the road and without locking the wheels.

Figure 3:
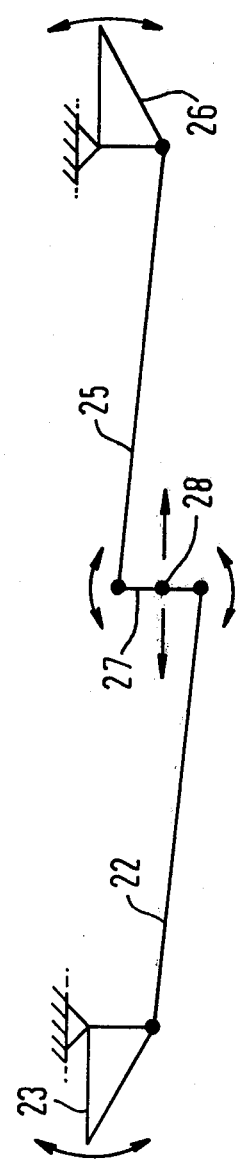
FIG. 3 is a diagrammatic view of part of a control mechanism shown in FIG. 1.
Figure 4:
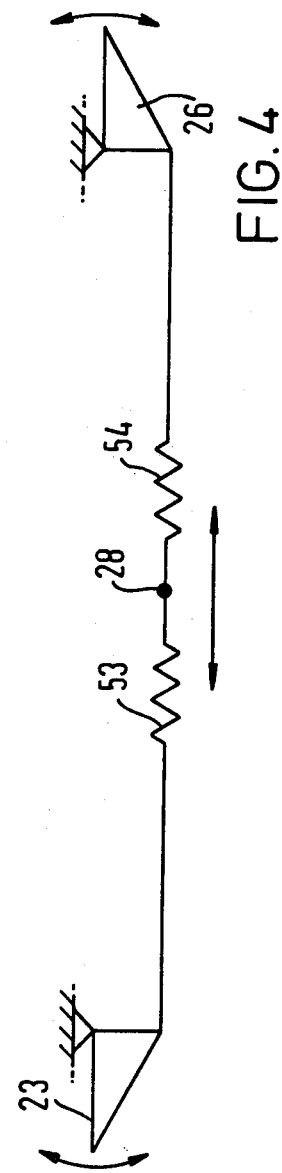
FIG. 4 is a diagrammatic view of an alternative control mechanism to that shown in FIGS. 1 and 3.

The horizontal links 22 and 25, the bell-cranks 23 and 26 and the vertical beam 27 are reproduced diagrammatically in FIG. 3 by way of comparison with an alternative control mechanism shown in FIG. 4 which is also responsive to vehicle suspension movements to exert an influence on the lever mechanism which comprises the horizontal beam 31. This alternative mechanism includes the bell-cranks 23 and 26 but the horizontal links 22 and 25 and the vertical beam 27 are replaced by tension springs 53 and 54 which connect with the pivot pin 28. The tension springs 53 and 54 are set with small equal preloads when the road wheels 14 and 17 are in their full rebound positions. When the vehicle is loaded to produce equal vertical loads on the wheels 14 and 17 the suspensions deflect by equal amounts and so the springs 53 and 54 deflect equally and there is no tendency to move the pivot pin 28. This remains true for driving maneuvers which produce equal changes in the wheel vertical load, including braking in a straight line.

When the vehicle corners, for example in the direction causing both bell-cranks 23 and 26 to turn clockwise relative to FIG. 4, then the tension springs 53 and 54 move towards the left of FIG. 4, moving the pivot pin 28 towards the axis of plunger 38 of the first valve device 12 and altering the ratio of beam 31 as described above in relation to FIG. 1.

Figure 5:
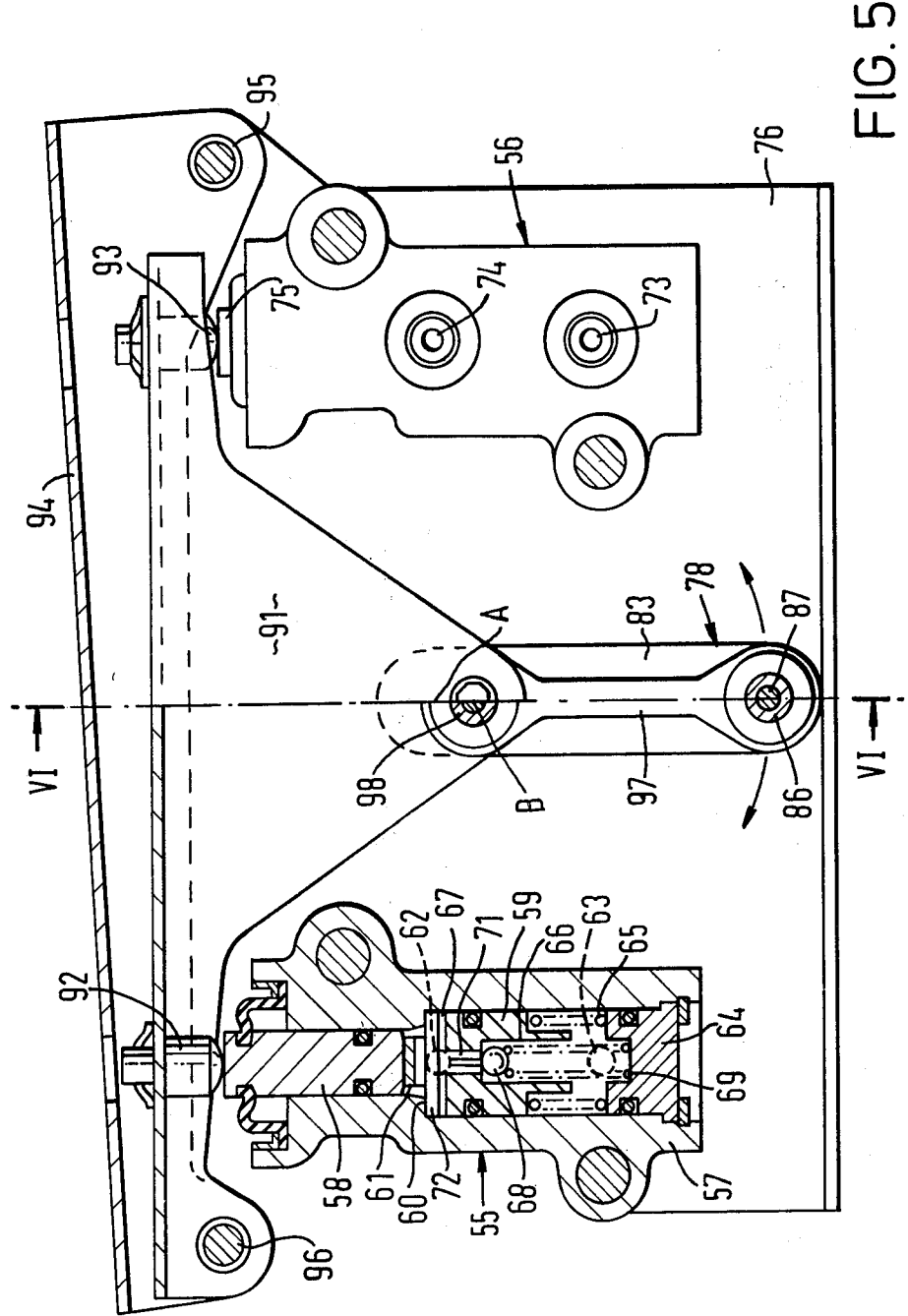
FIG. 5 is a partial cross-section of a pair of valve devices and a lever mechansim which are alternatives to those shown in FIG. 1.
Figure 6:
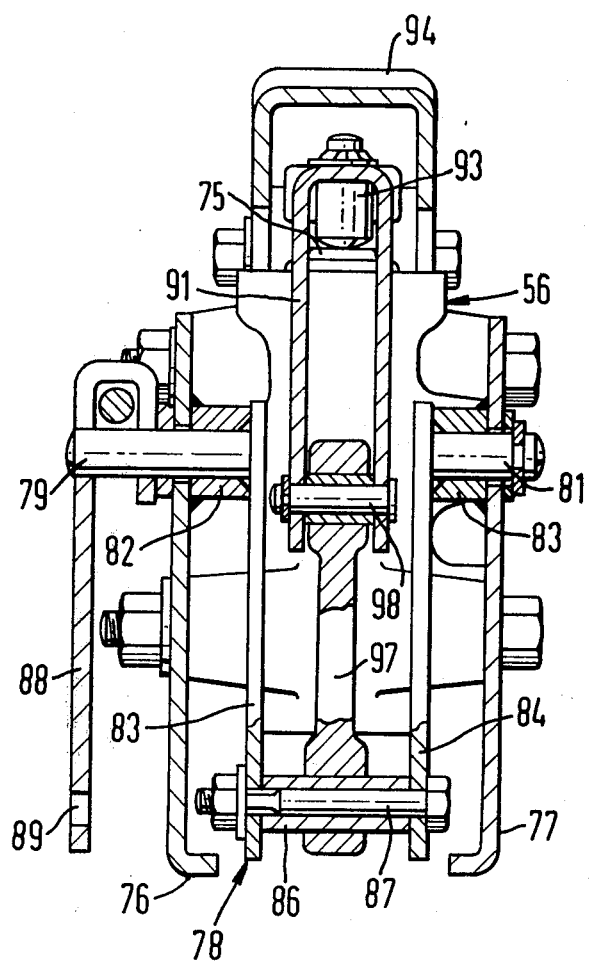
FIG. 6 is a cross-section on the line VI—VI of FIG. 5.

The valve devices 55 and 56 shown in FIG. 5 and FIG. 6 are of different construction to those shown in FIG. 1 and are used in conjunction with a different lever mechanism. The first valve device 55 is identical to the second valve device 56 so only it will be described in detail. It comprises a housing 57 having a stepped axial through bore. A small diameter plunger 58 is slidable in the small diameter bore portion and projects a small distance from the upper end of the bore. A large diameter plunger 59 is slidable in the large diameter bore portion and has a small axially projecting nose 61 for abutment with the adjacent end of the small diameter plunger 58.

An outlet port 62 is connected to the brake 13 for wheel 14 and opens into the stepped bore at the step 60 between the large diameter portion and the small diameter portion. An inlet port 63 is connected to the master cylinder 11 and opens into the larger diameter bore portion between the large diameter plunger and an end plug 64. A light compression spring 65 biasses the large diameter plunger 59 towards the small diameter plunger 58.

Communication between the inlet port 63 and the outlet port 62 is provided by stepped axial passage 66 in the large diameter plunger 59 and an intersecting diametral passage 67 whose axis coincides approximately with the shoulder between the main body of the plunger 59 and the nose 61.

A non-return valve is provided in the axial passage 66 by a ball 68 which can seat on the step between the large and small diameter portions of the passage 66 and which is biased in the seating direction by another light compression spring 69. However, in the position shown in FIG. 5 the ball 68 is prevented from seating by an axial pin 71 in the small diameter portion of the passage 66. This pin 71 abuts a transverse pin 72 in the diametral passage 67 and which in turn abuts the step 60. Pin 71 is fluted to allow flow through the passage 66 when the ball 68 is not seated.

Although the second valve device 56 is identical to the first valve device it will be convenient to identify separately the inlet port 73, which is also connected to the master cylinder 11 and which corresponds to inlet port 63, the outlet port 74, which is connected to the brake 16 for wheel 17 and which corresponds to outlet port 62, and the small diameter plunger 75 which corresponds to plunger 58.

The valve devices 55 and 56 are bolted to a frame comprising two plates 76 and 77 which are in turn attached to the body of the vehicle. A crank assembly 78 comprises two stub shafts 79 and 81 which are journalled in bosses 82 and 83 on plates 76 and 77 respectively. Shaft 79 is attached by projection welding or other means to a crank arm 83 and shaft 81 is similarly attached to an identical crank arm 84. The crank arms 83 and 84 are linked near their radially outer ends by a crank pin assembly comprising a tubular sleeve 86 and a bolt 87.

The crank assembly 78 can be rotated about the axis of the stub shafts 79 and 81 by an arm 88 which is clamped to the longer stub shaft 79. A hole 89 is for receiving the pivot pin 28 of the control mechanism described above with reference to FIGS. 1 and 3 or the alternative control mechanism described with reference to FIG. 4.

A lever mechanism linking the plungers 58 and 75 of the valve devices 55 and 56 includes a beam 91 of inverted channel-section carrying two buttons 92 and 93 to contact plungers 58 and 75 respectively. The buttons 92 and 93 each have a part spherical end face to allow pivoting on the end faces of the plungers. Longitudinal location for the beam is provided by an inverted channel-section location link 94 which is pivoted to the plates 76 and 77 by a bolt 95 and to the beam 91 by a bolt 96.

The beam 91 is pivotally connected to a control link 97 by a pin 98, the link 97 also being pivotally connected to the sleeve 86 of the crank assembly 78 which acts as a reaction link to react forces on the beam onto the body of the vehicle through the plates 76 and 77.

In FIGS. 5 and 6 the crank assembly 78 is shown in the position adopted for normal straightahead movement of the vehicle. In this position the crank arms 83 and 84 have their longitudinal axes lying in the same plane as the longitudinal axis of the control link 97 and the pivot axes of the stub shafts 79 and 81, the crank pin assembly (87 and 88) and pin 98, so that the longitudinal axes of the control link 97 and the crank arms 83 and 84 are parallel to and equidistant from the axis of plungers 58 and 75. As previously mentioned, in the valve devices 55 and 56 each of the large diameter plungers 59 is in abutment with the respective step 60 and to ensure this there is a small cumulative clearance between all the plungers of the valve devices and the buttons 92 and 93 on the beam 91 when there is no fluid pressure in the braking system. When the driver operates the master cylinder 11 to apply the brakes, pressure is transmitted past the unseated balls 68 to the respective outlet ports 62 and 74 and thus to the brakes 13 and 16. Since the pressures at the outlet ports 62 and 74 are equal, the same forces are generated on each of the small diameter plungers 58 and 79 which forces are balanced by the beam 91.

If the vehicle corners so that, for example, wheel 17 is on the outside of the corner and thus rises relative to the vehicle body and wheel 14 is on the inside of the corner and drops relative to the body, then the crank assembly 78 is rotated anti-clockwise relative to FIG. 5 by an amount which depends on the relative deflection of wheels 14 and 17 and thus on the amount of centripetal acceleration of the vehicle. This is shown diagrammatically in FIG. 7. The pivot axis of the crank assembly is denoted A (also in FIG. 5) and the pivot axis of control link 97 on the beam 91 denoted B. When the driver operates the master cylinder 11 the effective moment arm which the load from plunger 75 of valve device 56 makes with axis B is increased from distance "a" to distance "b" (FIG. 7) whereas the effective moment arm which the load reacted from plunger 58 of valve device 55 makes with axis B is reduced from distance "a" to distance "c". The distances b and c can be calculated or measured from the point at which the longitudinal axis of the control link 97 intersects the perpendicular line joining pivot axis C where button 92 pivots on plunger 58 and pivot axis D where button 93 pivots on plunger 75.

The effect of the change in lever ratio of the beam 91 is to cause the plungers 58 and 59 of valve device 55 to move towards its end plug 64 whilst plunger 75 of valve device 56 moves away from its large diameter plunger and the associated end plug. When large diameter plunger 59 has moved a sufficient amount to allow ball 68 to seat, a further increase in brake pressure at outlet port 62 is prevented. The beam 91 then assumes a state of balance, plunger 75 exerting a force on button 93 which is equivalent to master cylinder pressure acting on the full cross-section area of plunger 75 and plunger 58 exerting on button 92 a force which is equivalent to brake pressure acting on the full cross-sectional area of plunger 58 plus a force equal to the difference in master cylinder pressure at port 63 and brake pressure at port 62 acting on the full cross-sectional area of plunger 59. This state of balance is maintained for increasing master cylinder pressure or decreasing cornering acceleration by the plungers 58 and 59 of valve device 55 shuttling to unseat and seat ball 68. For decreasing master cylinder pressure or increasing cornering acceleration, the plungers 58 and 59 move together towards end plug 64 to increase the volume of the annular chamber around the nose 61 and so reduce brake pressure at port 62.

Since the braking system is symmetrical cornering in the other direction has a similar effect on valve device 56 to that described above for valve device 55. The performance characteristics of the modified system are as described above in respect of FIG. 2.

Figure 7:
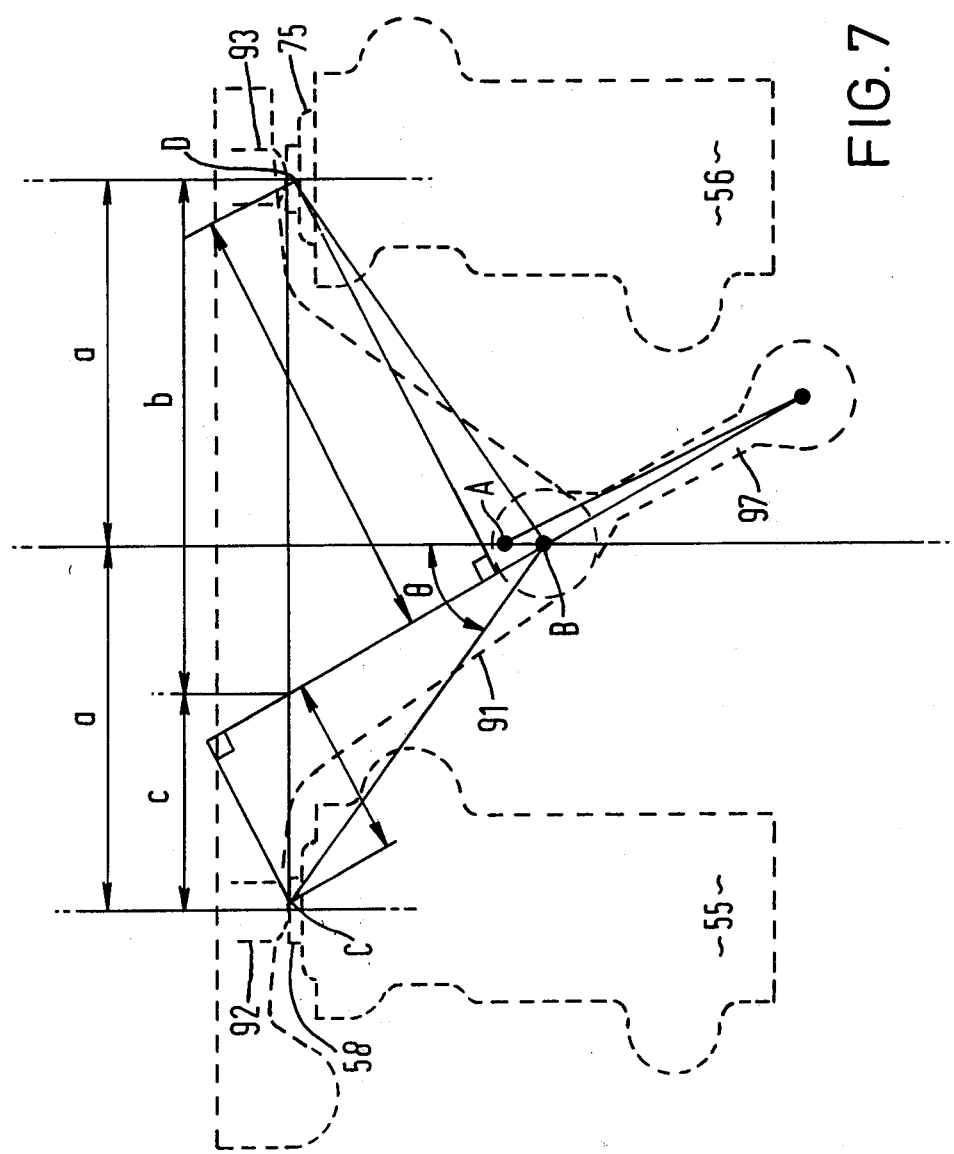
FIG. 7 is a diagram showing how the ratio of the lever mechanism shown in FIG. 5 changes during cornering of the vehicle.

From FIG. 7 it can be seen that when the control link 97 is in its normal, vertical position (with respect to FIG. 7) its longitudinal axis intersects the perpendicular line joining pivot axis C and pivot axis B at an angle $\theta$ which is substantially less than 90° and it is by virtue of this geometrical relationship that the effective moment arm which the load from plunger 58 makes with axis B is varied by rotation of the control link 97 to change angle $\theta$. From FIG. 5 it can be seen that the longitudinal axis of the location link 94 (the line joining the axis of pins 95 and 96 passes through the pivot axes C and D and thus the location link 94 can react the longitudinal component of the load in the control link 97 without putting a turning moment on the beam 91.

The beam 91 can be conveniently considered as a lever having two modes of operation depending on the direction of cornering of the vehicle. Thus buttons 92 and 93 can both be said to act as first pivotal connections of the beam 91 with the plungers 58 and 75 whilst pin 98 acts as a second pivotal connection by which the beam 91 is connected to the body of the vehicle through control link 97. Both buttons 92 and 93 act as means of transmitting loads to and from the respective plungers 58 and 75 so that the geometrical relationship described in the preceding paragraph can be generalised by stating that the variable ratio effect of the lever mechanism is achieved by making the longitudinal axis of the control link normally intersect a perpendicular line joining the axis of a first pivotal connection and the axis of the second pivotal connection at an angle ($\theta$) which is substantially less than 90°. This generalised relationship applies to the lever mechanisms which will be described below with reference to FIGS. 8 to 10 of the accompanying drawings.

Some angular movement of the beam 91 takes place when the plungers move into the metering position when the ball 68 is just seated or, as described above, move beyond the metering position to reduce the pressure at the brakes. To keep the angular deviation of the control link 97 relative to the crank arms 83 and 84 as small as possible the axis of rotation A of the crank assembly 78 is offset from pivot axis B which the control link makes with the beam 91. Thus the angular deviation which can be seen in FIG. 7 reduces when the beam 91 moves as a result of the driver operating the master cylinder. By keeping this angular deviation as small as possible the loads interacting between the control mechanism and the lever mechanism are minimised.

Whilst the valve devices 55 and 56 could be replaced by valve devices 12 and 15 shown in FIG. 1 with a reversal of the connections to the brakes at the outlet ports or a modification to the control mechanism to reverse its action during cornering, valve devices 55 and 56 show distinct advantages over the simpler valve devices 12 and 15. Indeed, they may be used to replace valve devices 12 and 15 in FIG. 1, also with a reversal of the connections to the brakes or a modification of the control mechanism to reverse its action during cornering.

One advantage of valve devices 55 and 56 is that each can be used in separate sub-systems of a split braking system. For example, inlet port 63 of valve device 55 is connected to one outlet port of a tandem master cylinder and inlet port 73 of valve device 56 is connected to the other outlet port of the tandem master cylinder. If pressure at inlet port 73 fails whilst pressure remains supplied to inlet port 63, the small diameter plunger 58 of valve device 56 will move away from end plug 64 until stopped by the beam 91 and the large diameter plunger of valve device 56 abutting its end plug. However, the large diameter plunger 59 of valve device 55 will remain in the position shown in FIG. 5 and the available master cylinder pressure will be delivered by brake 13 from outlet port 62 during all cornering conditions.

Another advantage of valve devices 55 and 56 is that they require only a small total variation in the ratio of the lever mechanism so that wear can be relatively small. For example, the lever ratio required to reduce braking pressure to zero during cornering is the ratio of the cross-sectional area of the large diameter plunger 59 to that of the small diameter plunger. With valve devices 12 and 15 the load of the plunger 38 or 49 has to be reduced to zero so that the lever ratio has to be infinity, i.e. pivot pin 28 would have to be moved into line with the axis of plunger 38 or 49, or link 97 would have to swing into line with line B-C or line B-D (FIG. 7).

A third advantage of valve devices 55 and 56 is that any wear in the lever mechanism does not allow the ball 68 to seat when the vehicle is in the straight ahead condition.

Various modifications may be made to the lever mechanism shown in FIGS. 5 and 6 to help maintain a constant lever ratio when the valve devices are functioning. For example, crank arms 83 and 84 and control link 97 may be re-positioned so as to be rotated 180° from their positions shown. For this purpose the control link may be in two parts, one either side of the beam. Also the location link 94 may have its pivot axis on the beam mid-way between the buttons 92 and 93, i.e. the mid-point of a line joining axes C and D. An alternative but lesser improvement is to move the pivot pin 95 to coincide with the same mid-point between C and D.

Figure 8:
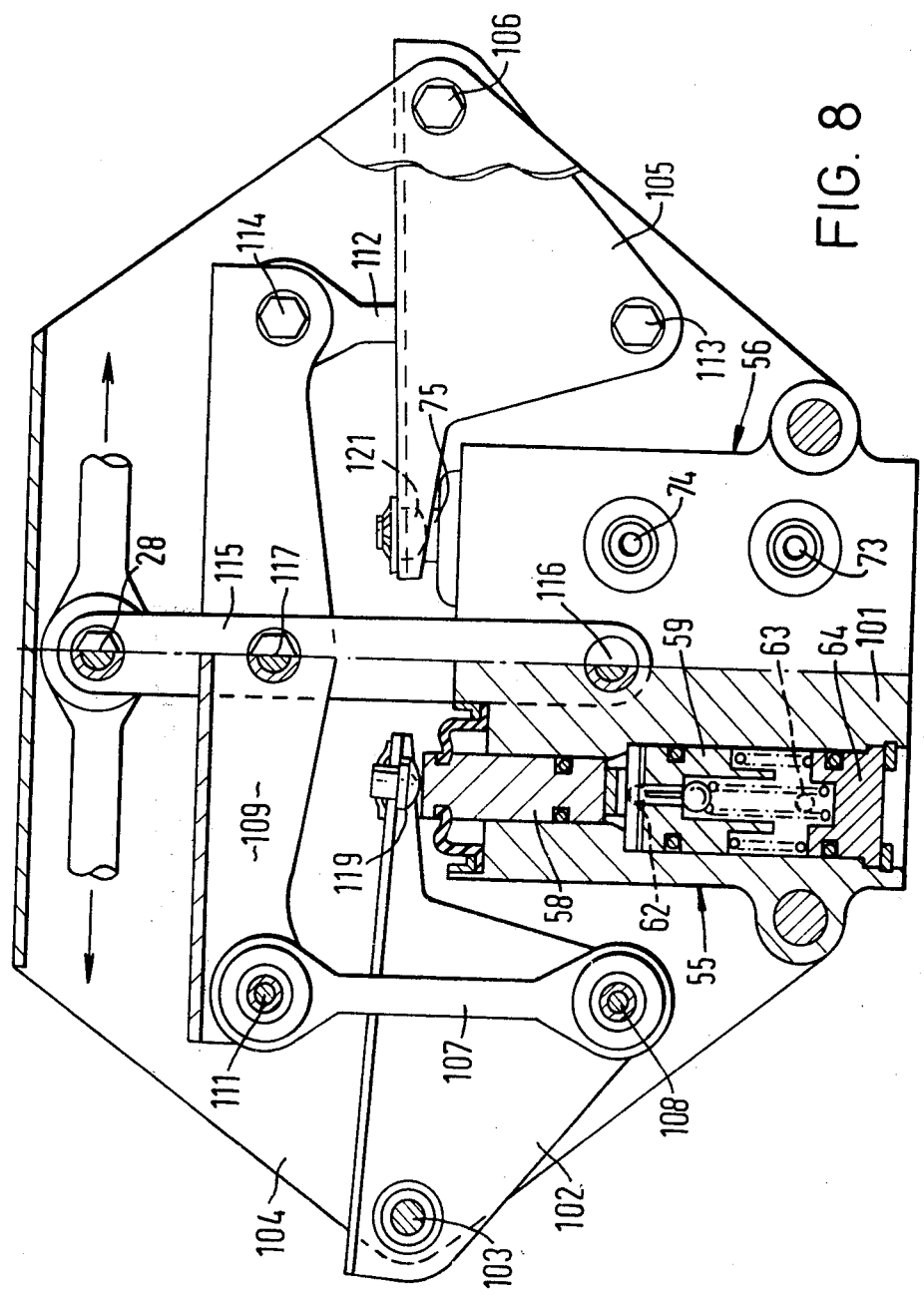
FIG. 8 is a partial cross-section of a pair of valve devices which are similar to those shown in FIG. 5 and a lever mechanism which is a further alternative to that shown in FIG. 1.

The lever mechanism shown in FIG. 8 is used in conjunction with the same valve devices 55 and 56 as are shown in FIGS. 5 and 6 but having a common housing 101. The lever mechanism includes one lever 102 which is pivoted by a pin 103 to a sheet metal frame 104 fast with the body of the vehicle and to which the valve housing 101 is attached and another lever 105 which is pivoted by a pin 106 to the frame 104. A control link 107 is pivotally connected to lever 102 by a pin 108 and to a beam by a pin 111 and another control link 112 is pivotally connected to lever 105 by a pin 113 and to the beam 109 by a pin 114. A reaction link 115 is pivotally connected to the valve housing 101 by a pin 116 and to beam 109 mid-way between pins 111 and 114 by a pin 117. This link 115 carries the pivot pin 28 by which the lever mechanism is connected to a control mechanism which is similar to that shown diagrammatically in FIG. 4.

Lever 102 carries button 119 for transmitting a load to and from plunger 58 of valve device 55 and similarly lever 105 carries a button 121 for transmitting a load to and from plunger 75 of valve device 56. The connections to the inlet and outlet ports are as described for FIG. 5, i.e., both inlet ports 63 and 73 are connected to the master cylinder 11 whilst outlet port 62 of valve device 55 is connected to brake 13 on wheel 14 and outlet port 74 of valve device 56 is connected to brake 16 on wheel 17.

FIG. 8 shows the valve devices 55 and 56 and the lever mechanism in the normal position for straightahead movement of the vehicle, the lever mechanism being arranged with a small cumulative clearance to ensure that the ball in each valve device is unseated. The mechanism is symmetrical in this position so that in braking the loading on the mechanism from plunger 58 is balanced by the loading from plunger 75.

If the vehicle corners so that, for example, wheel 14 drops relative to the vehicle body and wheel 17 rises, then pivot pin 28 moves to the right of FIG. 8, moving the beam 109 longitudinally and causing the control links to rotate clockwise relative to FIG. 8. This has the effect of increasing the angle which the longitudinal axis of link 107 makes with the perpendicular line joining the axes of a first pivotal connection provided by pin 108 and a second pivotal connection provided by pin 103 and reducing the angle which the longitudinal axis of link 112 makes the perpendicular line joining the axes of a first pivotal connection provided by pin 113 and a second pivotal connection provided by pin 106. Hence the effective moment arm which any direct force in link 107 makes with pivot 103 is increased whilst the effective moment arm which any direct force in link 112 makes with pivot pin 106 is reduced. When the driver operates the master cylinder 11 the plungers 58 and 59 of valve device 55 move towards end plug 64 whilst the small diameter plunger of valve device 56 moves away from the corresponding end plug. Valve device 55 then works as described above in relation to FIGS. 5 and 6 to reduce pressure at outlet port 62 relative to that at inlet port 63.

Figure 9:
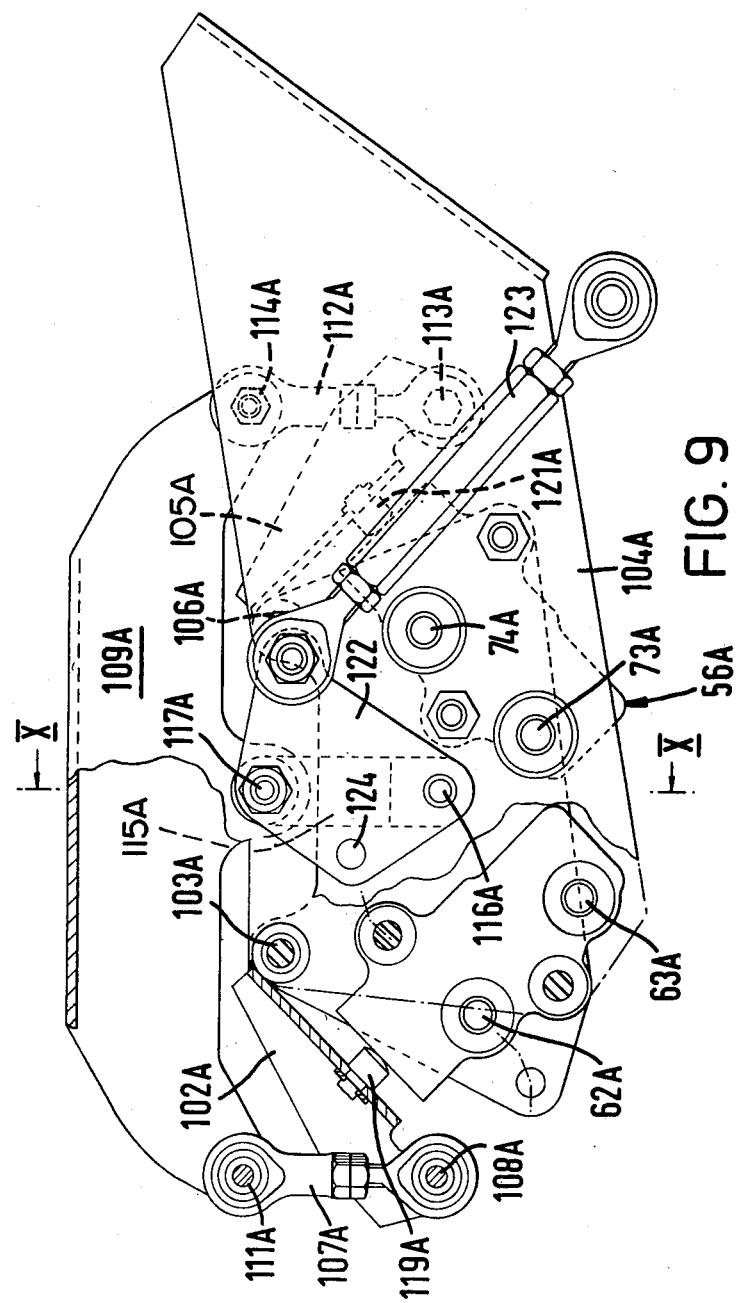
FIG. 9 is an elevation of a pair of valve devices which are similar to those shown in FIG. 5 and a lever mechanism which is a modification to that shown in FIG. 8, certain parts of the lever mechanism being shown in cross-section.
Figure 10:
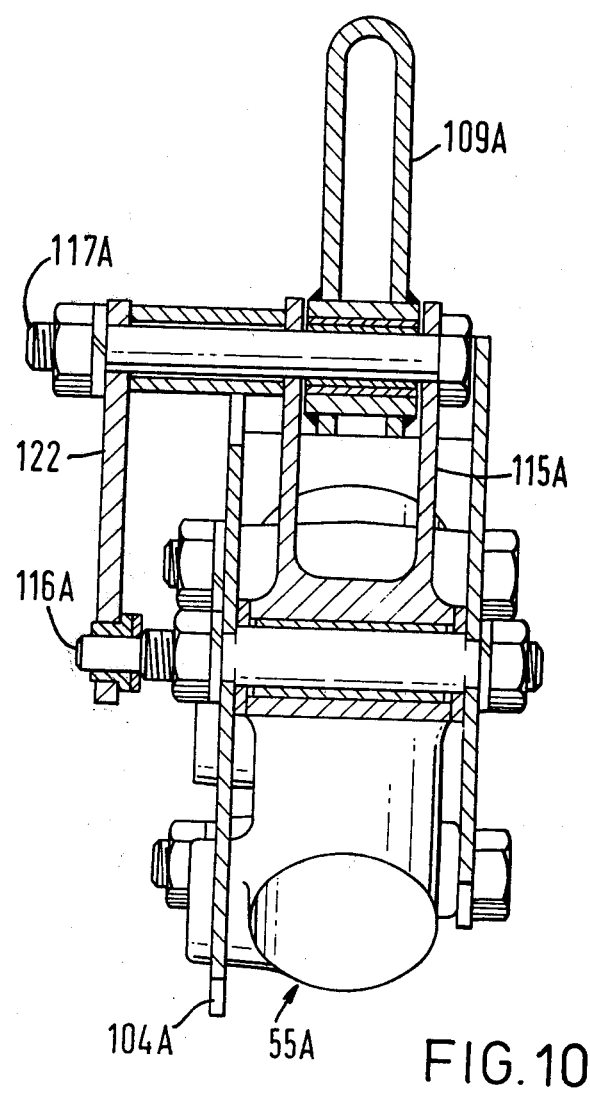
FIG. 10 is a cross-section on the line X—X in FIG. 9 on a larger scale than FIG. 10.
Figure 6:
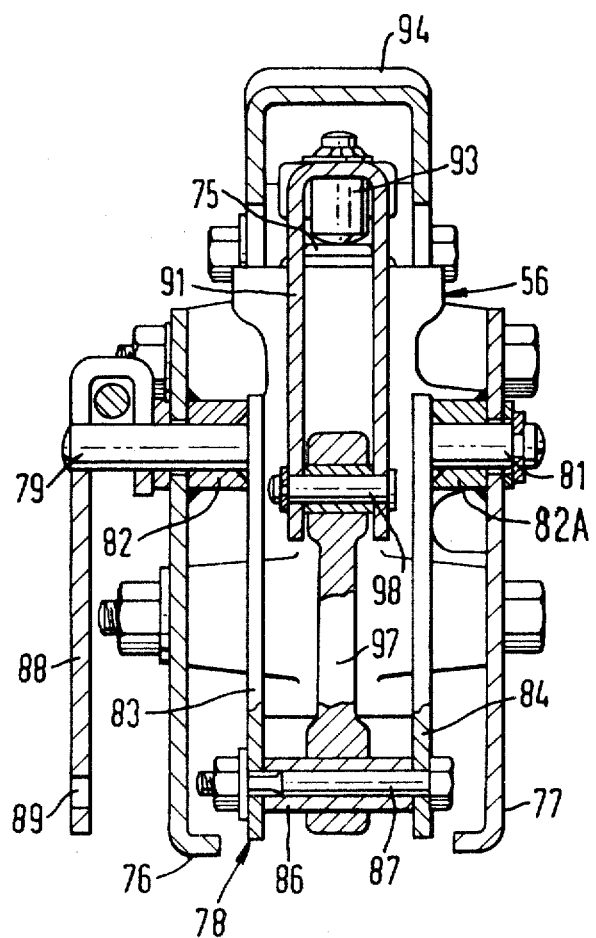

Since the lever mechanism shown in FIGS. 9 and 10 is a modification of that shown in FIG. 8 and the valve devices are substantially the same as those shown in FIG. 8 (and those shown in FIGS. 5 and 6), it will be convenient to use the same reference numerals with a suffix A added.

The principal modification is to the levers 102A and 105A since pins 103A and 106A which provide pivots on the modified frame 104A are now positioned between the lever control links 107A and 112A. Although beam 109A is now longer than beam 109, the thrust buttons 119A and 121A are now positioned on their respective lever between the axis pin 103A or 106A and the axis of pin 108A or 113A to enable the valve devices 55A and 56A to be arranged compactly within the frame 104A.

The reaction link 115A is connected to a lever 122 by a sleeved extension of pivot pin 117A, this lever being pivoted to an extension of pivot pin 116A so that it is effectively part of the reaction link 115A. A link 124 is provided for connection to a control mechanism which may be as shown in either FIG. 3 or FIG. 4, in which case the assembly as shown in FIG. 9 is positioned on the vehicle with link 123 lying horizontally. In this case the assembly as shown in FIG. 9 is positioned on the vehicle with the link 123 arranged vertically. A hole 124 in lever 122 aligns with a similar hole in the frame 104A to centralize the beam 109A while the control linkage is being installed on the vehicle.

Irrespective of the particular type of control mechanism used, the valve devices and lever mechanism shown in FIGS. 9 and 10 function substantially as described above for FIG. 8. The inlet and outlet port connections 62A, 63A, 73A and 74A are as described for the corresponding ports in valve devices 55 and 56. However, in the same example of cornering described above for the mechanism shown in FIG. 8 in which wheel 14 drops relatively to the vehicle body and wheel 17 rises, the beam 109A now has to be moved towards the left of FIG. 9 to provide the change in lever ratio which allows valve device 55A to reduce pressure at outlet port 62A relative to that at inlet port 63A when the master cylinder is operated in the corner.

In the lever mechanisms shown in FIGS. 8 to 10 the reaction link 115 or 115A is marginally shorter than the lever control links 107 and 112 or 107A and 112B. This is to help minimise the variation in lever ratio which occurs when the beam rocks as a result of the plungers in the valve devices moving under the master cylinder and brake pressures and also helps to minimise the loads interacting between the lever mechanism and the control mechanism. In the mechanism shown in FIGS. 9 and 10 this variation in ratio is further minimised by the modified arrangement of the levers 102A and 105A which brings the axis of pivot pins 103A and 106A much closer to the axis of pivot pin 117A which is the principal pivot axis of the beam 109A when the beam rocks. This means that the linkage formed by the left hand arm of the beam 119A, link 107A and lever 102A and the linkage formed by the right hand arm of beam 119A, link 112A and lever 105A begin to approximate to triangular linkages in which there would be no angular variation due to rocking of the beam.

The lever mechanisms described with reference to FIGS. 5 to 10 would be suitable for other applications which require a variable ratio, such as, for example, apportioning valves of the type disclosed in British Patent Specification No. 1,268,491.

I claim:

1. A variable ratio lever mechanism comprising:
    a frame;
    a lever having means for transmitting one load, a first pivotal connection for transmitting another load and a second pivotal connection for reacting the loads transmitted by the lever onto the frame;
    a control link connected to the lever by one of said pivotal connections;
    and a reaction link of substantially the same effective length as the control link pivoted on the frame and operatively connected to the control link; the arrangement being such that the control link has a longitudinal axis which normally intersects a perpendicular line joining the axes of the pivotal connections at an angle which is substantially less than 90°, which angle is variable by pivotal movement of the control link to vary the effective moment arm which said other load makes with the second pivotal connection, and such that the reaction link has a longitudinal axis which lies substantially parallel to the longitudinal axis of the control link over the normal operating range of pivotal moment of the control link.

2. The variable ratio lever mechanism of claim 1, wherein the lever is a single beam having a pivotal connection adjacent one end thereof for transmitting one load and a pivotal connection adjacent the other end thereof for transmitting another load so that each of said pivotal connections is a first pivotal connection, the beam having the axis of the second pivotal connection substantially equidistant from the axes of said first pivotal connections and offset from a perpendicular line passing through the axes of said first pivotal connections, one end of the control link being connected to the beam by the second pivotal connection and the other end being pivotally connected to the reaction link.

3. A variable ratio lever mechanism of claim 1, wherein two levers and two control links are provided and are arranged so that each lever is directly pivoted on the frame by the respective second pivotal connection, there also being provided a beam which interconnects the levers and the control links, the two control links being pivotally connected to the beam adjacent respective ends of the beam and the reaction link being pivotally connected to the beam substantially mid-way between the control links and being arranged to pivot on the frame to react the loads transmitted to the beam by the control links.

4. A fluid pressure braking system for a vehicle having a resilient suspension system, the braking system comprising:
    a driver-controlled source of fluid pressure;
    a first brake for braking a wheel which is on one side of the vehicle;
    a second brake for braking a wheel which is on the other side of the vehicle;
    a first valve device interposed between said source and said first brake;
    a second valve device interposed between said source and said second brake, each of said valve devices including a respective plunger which is subject to a fluid pressure loading from the pressure supplied to the respective brake and including a respective valve means which cooperates with the respective plunger to prevent flow from the source to the respective brake and reduce the pressure supplied to the brake relative to the source pressure when the respective plunger is moved in one direction;
    a variable ratio lever mechanism linking said plungers, said lever mechanism comprising a balance beam operatively connected adjacent to one end thereof to one of said plungers and operatively connected adjacent to the other end thereof to the other of said plungers, a pivot supported by the body of the vehicle for pivotally supporting the beam about an axis which is substantially mid-way between said ends and pivot control means operatively connected to the pivot for varying the lever ratio of the balance beam;
    and a control mechanism responsive to loads in the vehicle suspension system and being operatively connected to said pivot control means to vary the lever ratio of the beam during cornering of the vehicle,
    the arrangement being such that during normal straight-ahead braking the effort applied to the plunger of one of the valve devices by the fluid pressure loading within said one valve device is balanced by an equal effort applied to the plunger of the other of the valve devices by the fluid pressure loading within said other valve device so that equal pressures are applied to both brakes, the balance of the balance beam being maintained during cornering of the vehicle by the valve device associated with the brake which acts on the inboard wheel becoming operative to reduce the pressure supplied to that brake.

5. The braking system of claim 4, wherein said pivot is movable during vehicle cornering in a direction substantially parallel to the balance beam towards one end of the beam and away from the other end.

6. A fluid pressure braking system for a vehicle having a resilient suspension system, the braking system comprising:
    a driver-controlled source of fluid pressure;
    a first brake for braking a wheel which is on one side of the vehicle;
    a second brake for braking a wheel which is on the other side of the vehicle;
    a first valve device interposed between said source and said first brake;
    a second valve device interposed between said source and said second brake, each of said valve devices including a respective plunger which is subject to a fluid pressure loading from the pressure supplied to the respective brake and including a respective valve means which cooperates with the respective plunger to prevent flow from the source to the respective brake and reduce the pressure supplied to the brake relative to the source pressure when the respective plunger is moved in one direction;
    a frame for mounting on the body of the vehicle;
    a lever having means for transmitting a load from the plunger of one of the valve devices, a first pivotal connection for transmitting a load from the plunger of the other of the valve devices and a second pivotal connection for reacting the loads applied to the lever by the plungers onto the frame;

a control link connected to the lever by one of said pivotal connections;

a reaction link of substantially the same effective length as the control link pivoted on the frame and operatively connected to the control link, the control link having a longitudinal axis which normally intersects a perpendicular line joining the axis of the pivotal connections at an angle which is substantially less than 90°, which angle is variable by pivotal movement of the control link to vary the effective moment arm which the load from the plunger of said other valve makes with the axis of the second pivotal connection and the reaction link having a longitudinal axis which lies substantially parallel to the longitudinal axis of the control link over the normal operating range of pivotal movement of the control link, said lever, control link and reaction link forming a variable ratio lever mechanism linking said plungers such that during straight-ahead braking the effort applied to the plunger of one of the valve devices by the fluid pressure loading within said one valve device is balanced by an equal effort applied to the plunger of the other of the valve devices by the fluid pressure loading within said other valve device so that equal pressures are supplied to both brakes, and a control mechanism responsive to loads in the vehicle suspension system and operatively connected to the control link to vary the lever ratio of the variable ratio lever mechanism during cornering of the vehicle so that in order to maintain the balance of the lever mechanism due to said fluid pressure loadings the valve device associated with the brake which acts on the inboard wheel is operative to reduce the pressure supplied to that brake.

7. The braking system of claim 6, wherein the lever is a single beam having a pivotal connection adjacent to one end thereof for transmitting the load from the plunger of said one valve device and a pivotal connection adjacent to the other end thereof for transmitting the load from the plunger of said other valve device so that each of said pivotal connections is a first povotal connection, the beam having the axis of the second pivotal connection spaced substantially equidistant from the axes of said first pivotal connection and offset from a perpendicular line passing through the axes of said first pivotal connections, one end of the control link being connected to the beam by the second pivotal connection and the other end being pivotally connected to the reaction link.

8. The braking system of claim 6, wherein the lever mechanism comprises two levers and two control links which are arranged so that each lever is directly pivoted on the frame by the respective second pivotal connection, the lever mechanism further comprising a beam which interconnects the levers and control links, the control links being pivotally connected to the beam adjacent respective ends of the beam and the reaction link being pivotally connected to the beam substantially mid-way between the control links and being arranged to pivot on the frame to react the loads transmitted to the beam by the control links.

9. The braking system of claim 8, wherein the axis of the second pivotal connection of each lever is positioned between the axis of the respective control link and the reaction link and adjacent the axis of the pivotal connection of the reaction link to the beam.

10. A braking system according to claim 6, wherein there is a marginal difference between the effective length of the reaction link and the effective length of the control link.

* * * * *

UNITED STATES PATENT OFFICE
CERTIFICATE OF CORRECTION

PATENT NO. : 4,270,807
DATED : June 2, 1981
INVENTOR(S) : ALASTAIR J. YOUNG

It is certified that error appears in the above-identified patent and that said Letters Patent are hereby corrected as shown below:

Column 3, line 14, delete "Fig. 10" and insert --Fig. 9--.

Column 4, line 25, delete "devices" and insert --device--.

, line 28, delete "devices" and insert --device--.

Column 6, line 11, change "83" to --82A--.

Column 8, line 46, delete "56" and insert --55--.

Column 10, line 19, insert --of-- between "axis" and "pin".

, line 53, delete "112B" and insert --112A--

, line 66, delete "119A" and insert --109B--

, line 68, delete "119A" and insert --109B--

Figure 6 should appear as shown on the attached sheet.

Signed and Sealed this

Thirtieth Day of March 1982

[SEAL]

Attest:

Attesting Officer

GERALD J. MOSSINGHOFF
Commissioner of Patents and Trademarks